US006329008B1

(12) United States Patent
Wada

(10) Patent No.: US 6,329,008 B1
(45) Date of Patent: Dec. 11, 2001

(54) PROCESS FOR TREATING A FRIED GYOZA (A FRIED DUMPLING STUFFED WITH MINCED PORK) WITH WATER

(75) Inventor: Naoki Wada, Gunma (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/668,367

(22) Filed: Sep. 25, 2000

(30) Foreign Application Priority Data

Sep. 29, 1999 (JP) ........................................ 11-275886

(51) Int. Cl.$^{7}$ ........................................ A23L 1/00

(52) U.S. Cl. ........................................ 426/506; 426/520

(58) Field of Search ........................................ 426/506, 520, 426/523, 438

(56) References Cited

FOREIGN PATENT DOCUMENTS 58-056662 4/1983 (JP) .
58179443A * 10/1983 (JP) .
60-126064 7/1985 (JP) .
6-277013 10/1994 (JP) .

* cited by examiner

*Primary Examiner*—George C. Yeung
(74) *Attorney, Agent, or Firm*—Oblon, Spivak, McClelland, Maier & Neustadt, P.C.

(57) ABSTRACT

In a process for treating a fried gyoza (a fried dumpling stuffed with minced pork), the binding part (i.e. the ear part) of its pastry may be retained with a favorable soft texture even when exposed to long-term preservation in a frozen or a chilled state or when heated by a microwave oven. According to the present invention, the binding part of the pastry is treated with water while its fried part is positioned facing upwardly so as not to be contacted by the water.

4 Claims, 2 Drawing Sheets

PROCESS FOR TREATING A FRIED GYOZA (A FRIED DUMPLING STUFFED WITH MINCED PORK) WITH WATER

BACKGROUND OF THE INVENTION

1. Field of the Invention

The present invention relates to a process for treating a fried gyoza (a fried dumpling stuffed with minced pork) and more particularly to a process for treating a fried gyoza which makes the binding part (the ear part) of its pastry soft in texture even in such a case where it tends to dry out when exposed to long term preservation in frozen or chilled state and when heated by a microwave oven before eating.

2. Description of the Background

It has been hitherto known that a gyoza tends to become hard in the binding part of its pastry when exposed to long term preservation and to microwave heat treatment and some attempts have been made to improve such an unfavorable property with respect to a raw gyoza and a steamed gyoza.

For example, Japanese Laid-Open Patent Application Serial Nos. 60-126064 and 6-277013 proposed a process wherein room temperature water or hot water is showered on the pastry of raw gyoza in the steaming step. In the case of this process, however, since the raw gyoza is arranged with the binding part of its pastry facing up so as to retain its shape, the water content in the bottom part to be fried or baked is increased by the spontaneously fallen water so that the bottom part is swollen up to cause a problem of becoming unpleasant in texture. For this reason, such a process is not applicable to the treatment of the fried part in an industrial scale production of the fried gyoza.

Also, Japanese Laid-Open Patent Application No. 58-56662 describes a process wherein raw gyozas are arranged in a tray having drainage holes at the bottom and hot water is showered on each of the raw gyozas or the tray containing the raw gyozas is immersed in hot water, and thereafter the hot water-treated gyoza is subjected to steam treatment. In the case of this process, however, since the bottom part to be fried or baked is simultaneously treated with hot water, the water content in it is increased to cause a disadvantage in that its texture becomes too soft unlike the characteristic crispy texture. Accordingly, the process is not applicable to the treatment of the fried or baked part in the fried gyoza production operation to be carried out on a large scale in a factory.

An object of the present invention is to provide for treating a fried gyoza in a process which is feasible on an industrial scale and which makes the binding part (the ear part) of its pastry soft even when it is exposed to long term preservation measures, especially to frozen or chilled preservation or to heating by a microwave oven before eating.

SUMMARY OF THE INVENTION

As a result of having seriously studied to achieve the above objects, the present inventor has found that a fried gyoza which has been prepared by flying or baking a raw gyoza has a certain stability in the shape-retaining property to the extent that it retains its shape when arranged with the binding part of its pastry facing downward, namely with the fried part facing up and that, when the binding part of the pastry of the fried gyoza is treated with water while the fried part is positioned facing up so as not to be contacted by water, it may be kept soft in texture. It has been further found that a simple process is applicable to an industrial scale treatment wherein each fried gyoza is arranged with the fried part facing up in a tray having drainage holes at the bottom thereof and the tray is partially immersed in water to such an extent that the fried part is not contacted by water, thereby not only the fried part may be prevented from becoming exceedingly soft in feeling when eaten because the fried part of the gyoza is not wetted at all, unlike the processes hitherto applied to raw and steamed gyozas, but also the binding part of the pastry may be kept soft in texture even after long term preservation in a frozen state or even when heated by a microwave oven. In this case, each end of the binding part of the pastry which shows a greater tendency of becoming hard under the strong influence of radiant heat during the frying step may be uniformly treated with water by inclining the tray containing the fried gyozas at an adequate angle depending on the extent of immersion of the tray in water, whereby the binding part of the pastry may be kept soft in texture and the fried and side parts may be prevented from becoming exceedingly soft at the same time and furthermore the ingredients present inside may be prevented from becoming watery.

The present invention has been completed based on the above findings. That is, the invention is a process for treating a fried gyoza which process comprises the step of treating the binding part of the pastry with water while arranging it with its fried part facing up to prevent the fried part from contacting the water. The invention also is the process for treating a fried gyoza wherein the fried gyoza is placed in a tray having drainage holes at the bottom with its fried part facing up and the water treatment step is conducted by immersing the tray in a water tank to such an extent that the binding part of the pastry is wetted while the fried part is not wetted. The invention also is the process for treating a fried gyoza wherein the water treatment step is conducted by inclining the tray in the water tank to such an extent that the binding part of the pastry is wetted while the fried part is not wetted. The invention also is the process for treating a fried gyoza wherein the binding part of the pastry is treated with hot water of 60° C. or higher.

DETAILED DESCRIPTION OF THE INVENTION

Figure 1:
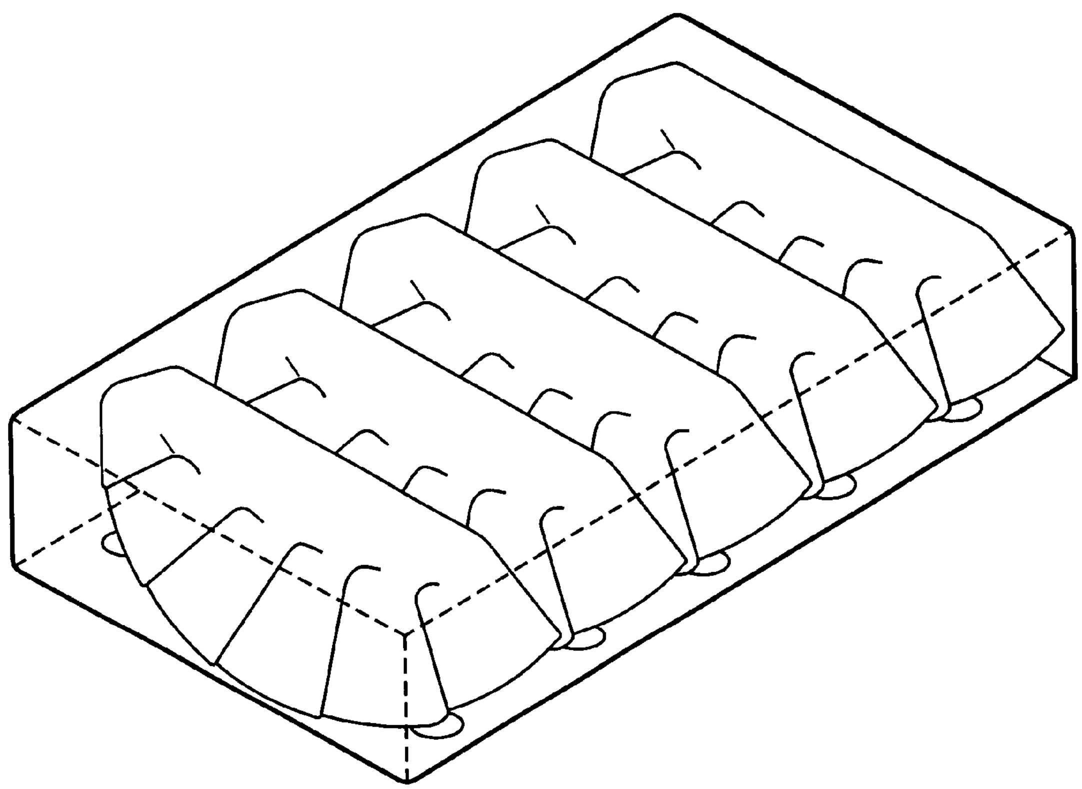
FIG. 1 is a perspective view illustrating fried gyozas arranged in a line in a tray with the respective fried parts facing up.

The fried gyoza prepared by a series of steps including frying treatment, sealing a package, and preserving in a frozen or chilled state in a factory is delivered to consumers via distribution channels for consumption. Also, each gyoza which is heated for thawing, steamed for cooking and sold in the form packed in a container at a supermarket store front or the like, is purchased by consumers and heated twice using a microwave oven at their home before eating. Such a second heating after once heating and cooking the frozen or chilled gyoza is often conducted. According to the present invention, even in such a case of re-heating after once cooking by heating the frozen or chilled and fried gyoza, the binding part of the pastry may be kept soft in texture.

The term "a fried gyoza" referred to in the present invention means one wherein frying or baking color has been imparted to the bottom of the gyoza by subjecting a molded raw gyoza containing ingredients wrapped in the pastry (i.e. a circular dough sheet) to frying or baking treatment in an oven, a frying pan or a hot plate or with their principle-applied machine which is capable of frying a number of gyozas at a time.

The term "the fried part of the gyoza" means the part to which frying or baking color is imparted when the gyoza has been subjected to frying or baking treatment. In other words, it constitutes the bottom of the molded gyoza. Also, the binding part of the pastry of the gyoza means the place which is formed when the ingredients have been wrapped in a circular pastry (dough sheet) by double bending the pastry and binding the circumferential part of the pastry together using water as an adhesive. It is also called the ear part.

Any material for forming the pastry and the ingredients of the gyoza may be used which material is usually used in the art.

As for the water treatment, water spraying, water showering, water immersion, water spreading and the like may be applied. Saccharides such as sorbic acid and trehalose, gum such as guar gum, and other processing material may be incorporated in the water.

Although the temperature at which the water treatment is carried out is not limited particularly, usually it may be a temperature higher than ordinary room temperature. If it is preferably hot water of 60 to 100° C. and more preferably hot water of 90 to 100° C., the water absorption of the binding part of the pastry becomes great so that the water treatment may be accomplished in a short time.

The time in which the water treatment is accomplished may be varied depending on the temperature and it may be adequately set such that the binding part of the pastry becomes soft in texture. For example, when hot water of 90 to 100° C. is used, a time of 0.01 to 180 sec. particularly 15 to 45 sec. is preferred so that the binding part of the pastry becomes soft.

The binding part of the pastry wherein the water content is 40 to 65% has an adequate softness. Especially the water content of 42 to 59% is preferred.

In the present invention, the water treatment of the gyoza is conducted arranging it with the fried part facing up. This step is intended to prevent the fried part from becoming exceedingly soft due to an excess increase in the water content if the water treatment is conducted by arranging the gyoza with the fried part facing downward as stated previously. This treatment is also intended to prevent the frying or baking color from becoming faded. Therefore, the water treatment should be conducted so as not to contact the fried part with water.

In the preferred embodiment of the present invention, each fried gyoza is arranged with its fried part facing up in a tray having drainage holes at the bottom as shown in FIG. 1, whereby a water immersion treatment may be easily conducted. After heating once, each gyoza is placed in a tray. By doing so, it retains its shape for the denaturation of the pastry by heating.

In the water spraying or water showering process, water is sprayed or showered on the binding part of the fried gyoza from a nozzle angle so as not to supply water to the fried part from the upper to the lower side.

In the water immersion treatment conducted in the state where the fried gyozas are placed in a tray having drainage holes at the bottom to such an extent that its fried part does not contact water, the fried part is always positioned above the surface of the water while the side and the binding parts of the pastry are immersed in water.

The terms "a tray having drainage holes at the bottom" indicate a tray having drainage holes at such a position that the water which has entered into the tray during the water immersion step can be spontaneously drained from the drainage holes by gravity after the water immersion treatment. Japanese Laid-Open Patent Application Serial No. 53-6472 discloses a process wherein steamed gyozas are subjected to a boiled water treatment while placed in a polypropylene tray having very small holes so that the holes may be closed by heating. In considering whether the water entered into the tray during the immersion step still remains without being drained, it is to be understood that this prior art tray is essentially different from the one at which the present invention aims.

As to the size of the drainage hole, it is not limited particularly if it is such that water may be spontaneously drained by gravity and that the function of the tray is not affected. The size may be within the range usually of from 2 mm to 30 mm in diameter, preferably from 2 mm to 15 mm in diameter, more preferably from 4 mm to 10 mm in diameter for the purpose of draining water efficiently and carrying out the function of the tray.

As to the position at which the tray is perforated with drainage holes, it is not limited particularly if almost all water present in the tray after the water treatment step may be spontaneously drained by gravity when the tray is positioned at a zero to 75-degree angle on the basis of its being placed horizontally. Usually the drainage holes are made on the bottom and the corner between the side and the bottom of the tray.

Figure 3:
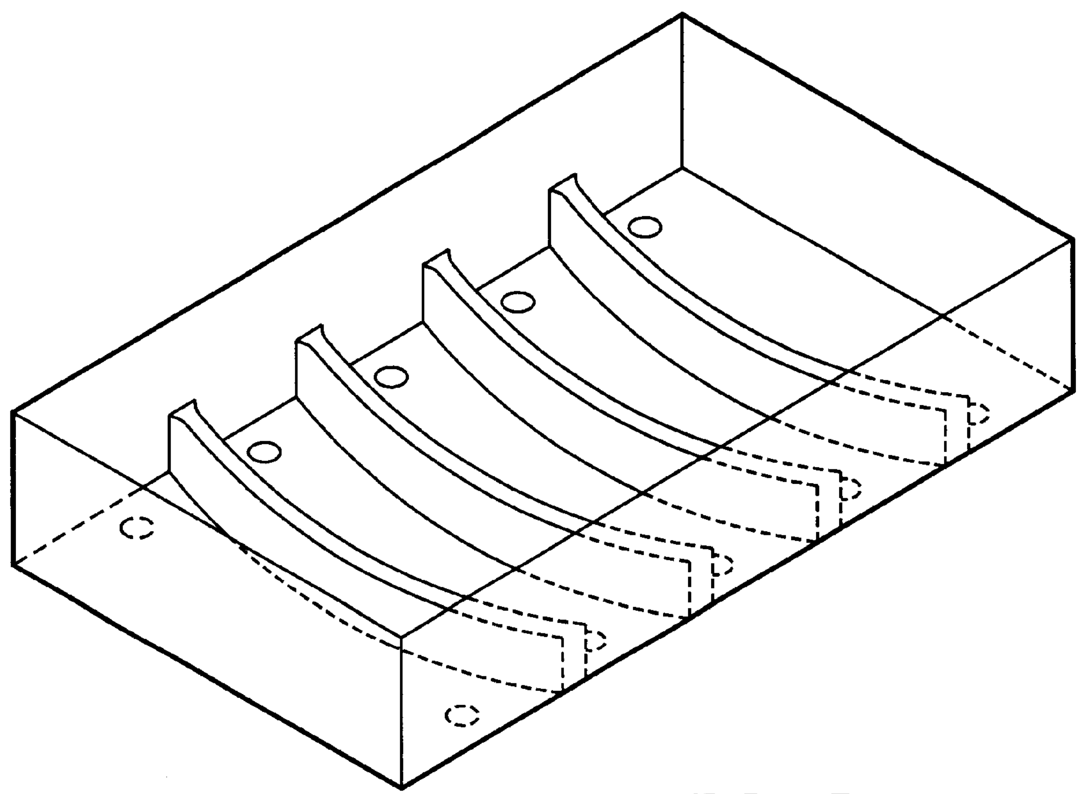
FIG. 3 is a perspective view illustrating a tray having drainage holes at the bottom and having plural compartment spaces each for a fried gyoza.

Although the number of the drainage holes is not limited particularly, it may be properly determined such that, after the water treatment step, water in the tray can be easily drained by gravity. Usually one or more of the drainage holes are arranged toward the compartment space per gyoza, preferably at right and left sides of each compartment space as shown in FIG. 3.

Figure 2:
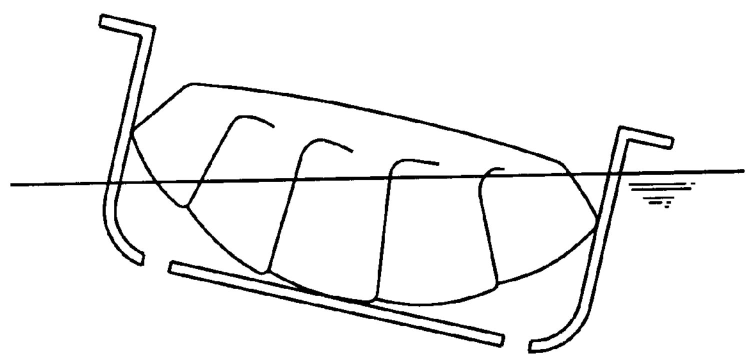
FIG. 2 is an end view illustrating the water immersion treatment of each fried gyoza by inclining the tray containing it in water.

The shape of a tray is not specified and may be one that has been generally used for gyozas in the prior art. As an example, the tray having the shape shown in FIG. 3 may be used. Also, for subjecting each end of the binding part of the gyoza to the water immersion treatment by inclining the tray containing gyozas to the right and left in a water tank, it is convenient if the tray is in such a shape that the gyozas present in it are still arranged in a line when inclined in a water tank as shown FIG. 2.

In the case where the tray containing gyozas is inclined in water so as to treat the binding part of each gyoza with water, since the binding part of the gyoza may be predominantly immersed in water, not only the binding part becomes soft by preventing the fried part from becoming soft but also the side of the pastry (i.e. the part other than the fried and binding parts) does not become soft exceedingly, and thus the quality and the commodity value of the gyoza is increased. The angle at which a tray containing gyozas is inclined may be varied depending on the shape of the gyoza and it may be easily determined. Usually it may be 15 to 75 degrees. Especially 15 to 50 degrees are preferred because the gyozas present in the tray inclined at such angles do not get out of their position.

If the water immersion treatment has been conducted, the water-treated gyoza is air-dried depending on necessity, sealed in a container together with the tray, subjected to frozen or chilled preservation, and put into the distribution channels for delivery to consumers. Example 1: the effect of hot water immersion A gyoza was molded with wrapping 17 grams of ingredients in 8 grams of circular pastry, and then cooked by frying at 190° C. for 5 minutes on an iron plate coated with oil. Thereafter, the fried gyozas were placed in a tray having drainage holes with the fried part facing up. The shape of a drainage hole was a circle with a diameter of 6 mm. Each drainage hole was a perforation made in the tray on the left and the right side of each compartment space per gyoza. The size of the tray was 150 mm×95 mm×33 mm.

The tray was immersed and inclined in a boiled water tank of 98° C. to the very limit (1 mm below the fried part) that the fried part of the gyozas placed therein was not contacted with hot water entering from the drainage holes but each end of the binding part of the pastry became wet so as to carry out the hot water immersion treatment of the binding part.

For water treatment of gyozas, each end of the binding part of the pastry was immersed twice in hot water for the prescribed time of 1, 5, 15, 30, 45, 60, 120, 180 and 240 sec. at a time. The tray containing the water-treated gyozas was placed in a freezer kept to −40° C. for 1 hour to prepare frozen and fried gyozas.

Also, a control sample of gyozas was prepared under the same condition as described above except that no hot water immersion treatment was conducted.

These frozen gyozas were steamed for 8 minutes to thaw them and then allowed to stand at room temperature for 1 hour. Thereafter, five gyozas of each group were heated for 1.5 min. in a 500 W microwave oven. The results of sensory evaluation conducted with respect to the softness of the binding part of the pastry and the results of all measurements conducted with respect to the water content in the binding part of the pastry obtained after the hot water immersion treatment are as shown in table 1. It can be seen from the results shown in table 1 that the binding part of the pastry with the water content of 40–65% has an adequate softness.

TABLE 1

| | Hot Water Immersion Time | Softness of Binding Part of the Pastry | Water Content |
|---|---|---|---|
| Control Group | (Not immersed in Hot Water) | X (Slightly Hard) | 38% |
| Test Group 1 | 1 sec. | Δ (Ordinary) | 44% |
| Test Group 2 | 5 sec. | ○ (Slightly Soft) | 46% |
| Test Group 3 | 15 sec. | ◎ (Soft) | 53% |
| Test Group 4 | 30 sec. | ◎ (Soft) | 55% |
| Test Group 5 | 45 sec. | ◎ (Soft) | 57% |
| Test Group 6 | 60 sec. | ○ (Considerably Soft) | 60% |
| Test Group 7 | 90 sec. | ○ (Considerably Soft) | 61% |
| Test Group 8 | 120 sec. | ○ (Considerably Soft) | 63% |
| Test Group 9 | 240 sec. | X (Exceedingly Soft) | 68% |

Comparative Example 1: The hot water-immersion treatment to be applied to each gyoza arranged with its fried part facing downward in a perforated tray.

The fried gyozas prepared in the same manner as in Example 1 were arranged with the fried part facing downward in a tray shown in FIG. 3 and then the tray was immersed for 15 sec. in a boiled water tank of 98° C. The tray was then taken out from the boiled water tank and placed in a freezer kept at −40° C. for 1 hour to prepare frozen and fried gyozas. These frozen gyozas were steamed for 8 minutes to thaw them and then allowed to stand at room temperature for 1 hour. Thereafter, five gyozas of each group were heated for 1.5 min. in a 500 W microwave oven for sensory evaluation. The drainability of the tray when taken out from the boiled water tank was also evaluated. These results are shown in table 2.

Comparative Example 2: A tray having very fine drainage holes to be used and a top seal to be applied.

The fried gyozas prepared in the same manner as in Example 1 were arranged with the fried part facing up in a tray having each drainage hole of 1 mm in diameter (eight drainage holes were made uniformly in each compartment bottom per gyoza) and the top was sealed. The tray was immersed for 3 minutes in a boiled water tank of 98° C. and then taken out from the boiled water tank. Afterwards it was placed in a freezer kept at −40° C. for 1 hour to prepare frozen fried gyozas. These frozen gyozas were steamed for 8 minutes to thaw them and then allowed to stand at room temperature for 1 hour. Thereafter, five gyozas were heated for 1.5 min. in a 500 W microwave oven for a sensory evaluation test. The drainability of the tray when taken out from the boiled water tank was also evaluated. These results are shown in table 2.

TABLE 2

| | Softness of Binding Part of the Pastry | Feeling of the Fried Part on Eating | Drainability |
|---|---|---|---|
| Control Group | X (Slightly Hard) | ◎(Ordinary) | — |
| Test Group 4 | ©(Soft) | ◎(Ordinary) | ◎Good |
| Comparative Example 1 | ©(Soft) | X (Soft) | ◎Good |
| Comparative Example 2 | X (Exceedingly Soft) | Δ (Slightly Soft) | X (Bad because Water Still Remains in the Tray) |

In the case of this tray. the following problems were encountered. It takes too much time for the water-treatment step because of the slow entering speed of the hot water and the feeling upon eating them varies greatly depending upon the place in the binding part of the pastry.

EFFECT OF THE INVENTION

According to the present invention, a simple process is carried out in which the binding part (i.e. the ear part) of the pastry of the fried gyoza is subjected to a water treatment while the fried part is positioned facing upward so as not to be contacted by water. Thereby, the binding part of the pastry may be still retained with a favorable soft texture even when the fried gyoza was exposed to long-term preservation measures, especially to frozen or chilled preservation and to heating by a microwave oven.

What is claimed is:

1. A process for treating a fried dumpling stuffed with minced pork which process comprises the step of treating a binding part of a pastry of the dumpling with water while arranging the dumpling with a fried part facing up in order to prevent the fried part from contacting the water so that the binding part of the pastry remains soft in texture even when exposed to long-term preservation and when heated.

2. The process for treating a fried dumpling as recited in claim 1, wherein the fried dumpling is arranged in a tray having drainage holes at a bottom thereof with the fried part facing up and wherein the water treating step is conducted by immersing the tray in a water tank to such an extent that the binding part of the pastry is wetted while the fried part is not wetted.

3. The process for treating a fried dumpling as recited in claim 2, wherein the water treating step is conducted by inclining the tray in the water tank to such an extent that the binding part of the pastry is wetted while the fried part is not wetted.

4. The process for treating a fried dumpling as recited in any one of claims 1 to 3 wherein the binding part of the pastry is treated with hot water of 60° C. or higher.

* * * * *